(12) United States Patent
Nakai et al.

(10) Patent No.: US 9,367,451 B2
(45) Date of Patent: Jun. 14, 2016

(54) STORAGE DEVICE MANAGEMENT DEVICE AND METHOD FOR MANAGING STORAGE DEVICE

(75) Inventors: Hiroto Nakai, Yokohama (JP); Tatsunori Kanai, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 13/491,824

(22) Filed: Jun. 8, 2012

(65) Prior Publication Data

US 2012/0246397 A1    Sep. 27, 2012

Related U.S. Application Data

(63) Continuation of application No. PCT/JP2010/066465, filed on Sep. 15, 2010.

(30) Foreign Application Priority Data

Jan. 13, 2010    (JP) .................................. 2010-005260

(51) Int. Cl.
*G06F 13/00*    (2006.01)
*G06F 12/06*    (2006.01)

(52) U.S. Cl.
CPC .................................. *G06F 12/0638* (2013.01)

(58) Field of Classification Search
CPC .. G06F 12/0866; G06F 12/0246; G06F 12/08
See application file for complete search history.

(56) References Cited

U.S. PATENT DOCUMENTS 6,212,602 B1 *    4/2001    Wicki et al. .................... 711/122
6,321,300 B1 *    11/2001    Ornes et al. .................... 711/135
8,135,900 B2    3/2012    Kunimatsu et al.
2002/0073285 A1 *    6/2002    Butterworth .................... 711/154
2002/0169928 A1 *    11/2002    Kimura et al. ................. 711/137

(Continued)

FOREIGN PATENT DOCUMENTS

CN    1540523 A    10/2004
CN    101075211 A    11/2007

(Continued)

OTHER PUBLICATIONS

Office Action mailed Jan. 15, 2015 in Chinese Application No. 201080057433.0 (w/English translation).

(Continued)

*Primary Examiner* — Charles Rones
*Assistant Examiner* — Han Doan
(74) *Attorney, Agent, or Firm* — Oblon, McClelland, Maier & Neustadt, L.L.P.

(57) ABSTRACT

According to one embodiment, a storage device management device is connected to a random access memory and a first storage device. When the random access memory includes a free region sufficient to store write data, the write data is stored onto the random access memory. Data on the random access memory selected in the descending order of elapsed time from the last access is sequentially copied onto the first storage device, and a region in the random access memory which has stored the copied data is released. When stored on the random access memory, the read data is read from the random access memory to the processor. When stored on the first storage device, the read data is copied onto the random access memory and read from the random access memory to the processor.

22 Claims, 9 Drawing Sheets

(56) References Cited

U.S. PATENT DOCUMENTS

| | | | |
|---|---|---|---|
| 2002/0174304 A1* | 11/2002 | Wang et al. .................. 711/144 |
| 2005/0204099 A1* | 9/2005 | Morrow ....................... 711/143 |
| 2007/0150691 A1* | 6/2007 | Illendula et al. ............. 711/170 |
| 2008/0229003 A1* | 9/2008 | Mizushima et al. .......... 711/103 |
| 2008/0244165 A1* | 10/2008 | Kunimatsu ................... 711/103 |
| 2008/0288716 A1 | 11/2008 | Arakawa |
| 2009/0070517 A1* | 3/2009 | Kaneko et al. ............... 711/102 |
| 2009/0164743 A1 | 6/2009 | Yoshii et al. |
| 2010/0017556 A1* | 1/2010 | Chin et al. .................. 711/103 |
| 2010/0042773 A1* | 2/2010 | Yeh ............................. 711/103 |
| 2010/0064111 A1 | 3/2010 | Kunimatsu et al. |
| 2012/0030405 A1 | 2/2012 | Kunimatsu et al. |
| 2012/0030428 A1 | 2/2012 | Yasufuku et al. |

FOREIGN PATENT DOCUMENTS

| | | |
|---|---|---|
| CN | 101308698 A | 11/2008 |
| JP | 61-15247 A | 1/1986 |
| JP | 1-162956 A | 6/1989 |
| JP | 2004-348342 A | 12/2004 |
| JP | 2006-252535 A | 9/2006 |
| JP | 2007-242163 A | 9/2007 |
| JP | 2008-242944 A | 10/2008 |
| JP | 2008-310793 A | 12/2008 |
| JP | 2008-546053 A | 12/2008 |
| JP | 2009-151603 A | 7/2009 |
| JP | 2010-250845 A | 11/2010 |
| WO | WO 2009/084724 A1 | 7/2009 |

OTHER PUBLICATIONS

International Preliminary Report on Patentability issued Jul. 26, 2012, in PCT/JP2010/066465, filed Sep. 15, 2010.

Office Action issued May 7, 2013 in Japanese Patent Application No. 2010-005260 with English language translation.

Office Action mailed Jun. 4, 2014 in Chinese Application No. 201080057433.0 (w/English translation).

International Search Report issued Nov. 30, 2010 in PCT/JP2010/066465 filed Sep. 15, 2010.

Written Opinion issued Nov. 30, 2010 in PCT/JP2010/066465 filed Sep. 15, 2010.

* cited by examiner

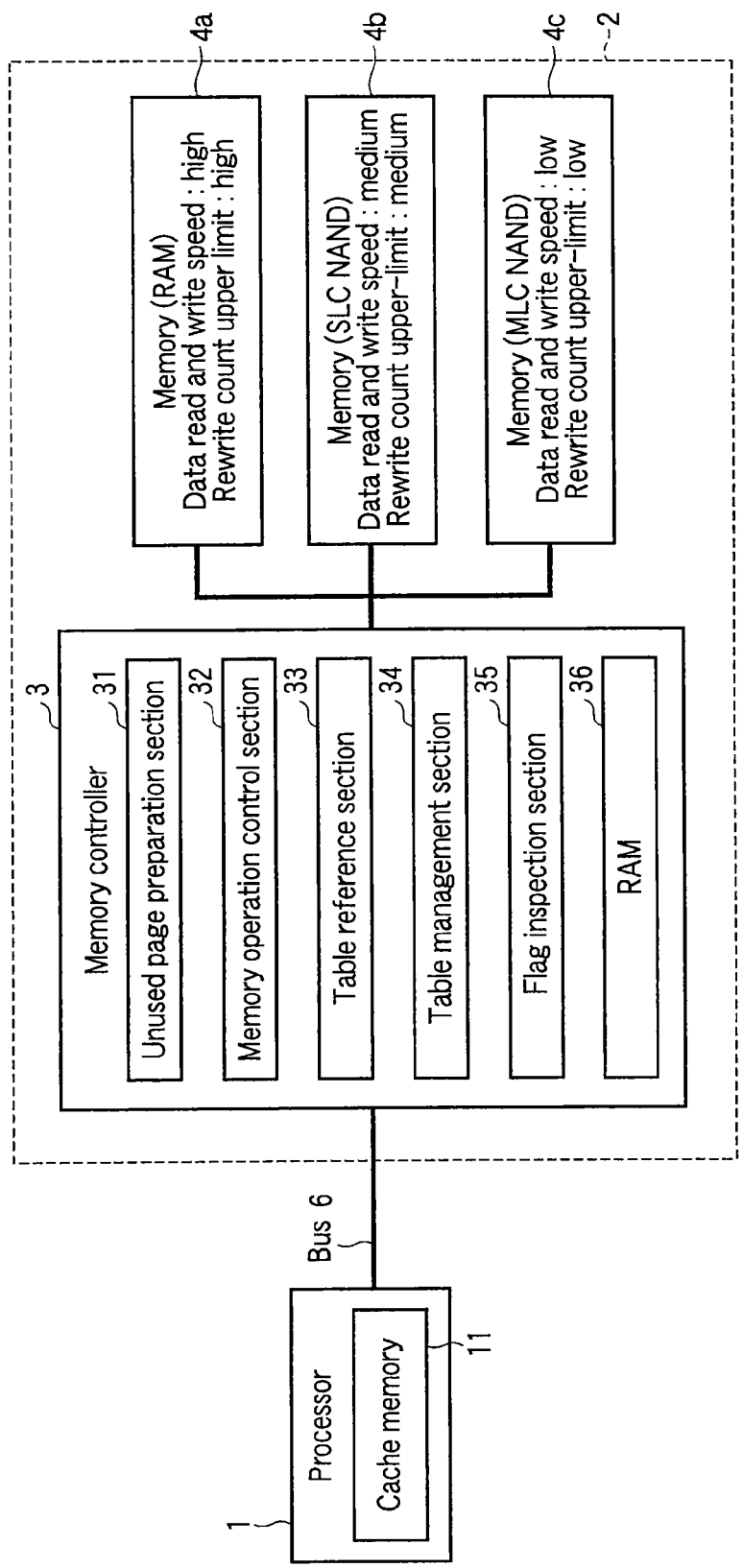
F I G. 1

Page table (logical-physical conversion table)

| Logical page address | Flag | RAM address | NAND address |
|---|---|---|---|
| 0 | | | |
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |

FIG. 2

RAM physical page management table

| Physical page | Valid/invalid indication | Last access time |
|---|---|---|
| 0 | 1 | 59021398 |
| 1 | 0 | 0 |
| 2 | 1 | 46235434 |
| 3 | 1 | 50678282 |
| 4 | 0 | 0 |

FIG. 3

SLC NAND flash physical page management table

| Physical block | Read count | Write count | Last access time | Valid/invalid indication for each page | | | | | | |
|---|---|---|---|---|---|---|---|---|---|---|
| 0 | 12 | 7 | | 1 | 1 | 0 | 0 | ... | 0 | 1 | 0 |
| 1 | 22 | 7 | | 0 | 1 | 1 | 1 | ... | 0 | 0 | 1 |
| 2 | 43 | 7 | | 1 | 1 | 0 | 0 | ... | 1 | 0 | 0 |
| 3 | 17 | 7 | | 0 | 1 | 0 | 0 | ... | 1 | 1 | 0 |
| 4 | 9 | 6 | | 1 | 0 | 0 | 1 | ... | 0 | 1 | 0 |

F I G. 4

MLC NAND flash physical page management table

| Physical block | Read count | Write count | Last access time | Valid/invalid indication for each page | | | | | | | |
|---|---|---|---|---|---|---|---|---|---|---|---|
| 0 | 12 | 7 |  | 1 | 1 | 0 | 0 | ... | 0 | 1 | 0 |
| 1 | 22 | 7 |  | 0 | 1 | 1 | 0 | ... | 1 | 0 | 1 |
| 2 | 43 | 7 |  | 1 | 1 | 0 | 0 | ... | 0 | 0 | 0 |
| 3 | 17 | 7 |  | 0 | 1 | 0 | 0 | ... | 0 | 1 | 0 |
| 4 | 9 | 6 |  | 1 | 0 | 0 | 1 | ... | 1 | 0 | 0 |

F I G. 5

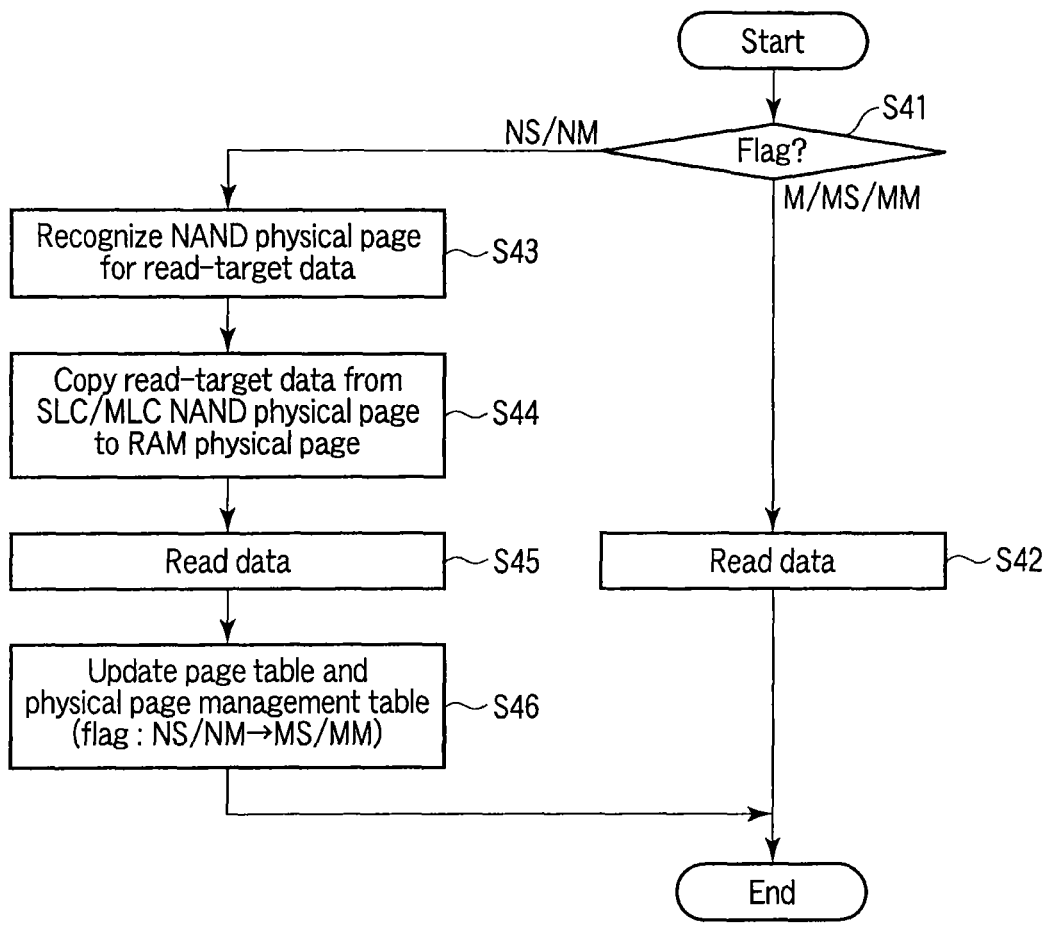
F I G. 10

US 9,367,451 B2

STORAGE DEVICE MANAGEMENT DEVICE AND METHOD FOR MANAGING STORAGE DEVICE

CROSS REFERENCE TO RELATED APPLICATIONS

This application is a Continuation Application of PCT Application No. PCT/JP2010/066465, filed Sep. 15, 2010 and based upon and claiming the benefit of priority from prior Japanese Patent Application No. 2010-005260, filed Jan. 13, 2010, the entire contents of which are incorporated herein by reference.

FIELD

Embodiments described herein relate generally to a storage device management apparatus configured to manage the storage state of a plurality of storage devices and a method for managing a storage device.

BACKGROUND

Computers normally includes several types of memories, for example, a cache memory, a main memory, and a secondary storage device (a hard disk drive or the like). Memories capable of performing faster accesses have smaller capacities and are more expensive. In the above-described example, the access speed and the storage capacity increase in order of the cache memory, the main memory, and the secondary storage device. In other words, the cache memory has the highest access speed and the smallest storage capacity and the secondary storage device has the lowest access speed and the largest storage capacity among them. Thus, memories are hierarchized. Specifically, data with a high use frequency is stored in the cache memory, data with a middle use frequency is stored in the main storage device, and data with a low use frequency is stored in the secondary storage device. In this manner, the memory which is to store data thereon is selected depending on the characteristics of the memory, which results in effective use of the memories by the computer.

For example, Jpn. Pat. Appln. KOKAI Publication No. 2008-242944 describes an integrated memory managing apparatus provided in the computer to manage accesses to the cache memory and the main memory in an integrated fashion.

Furthermore, Jpn. Pat. Appln. KOKAI Publication No. 2009-151603 describes a technique of using MRAM as a main storage device and using another nonvolatile memory as a backup.

BRIEF DESCRIPTION OF THE DRAWINGS

FIG. 1 is a block diagram of memory system according to an embodiment of the present invention;
FIG. 2 illustrates a page table used by a memory controller according to the embodiment;
FIG. 3 illustrates a RAM physical page management table used by the memory controller according to the embodiment;
FIG. 4 illustrates an SLC type NAND flash physical page management table used by the memory controller according to the embodiment;
FIG. 5 illustrates an MLC type NAND flash physical page management table used by the memory controller according to the embodiment;
FIG. 10 is a flowchart of a process carried out by the memory controller according to the embodiment in response to a read request for the data in the memory system.

DETAILED DESCRIPTION

Figure 6:
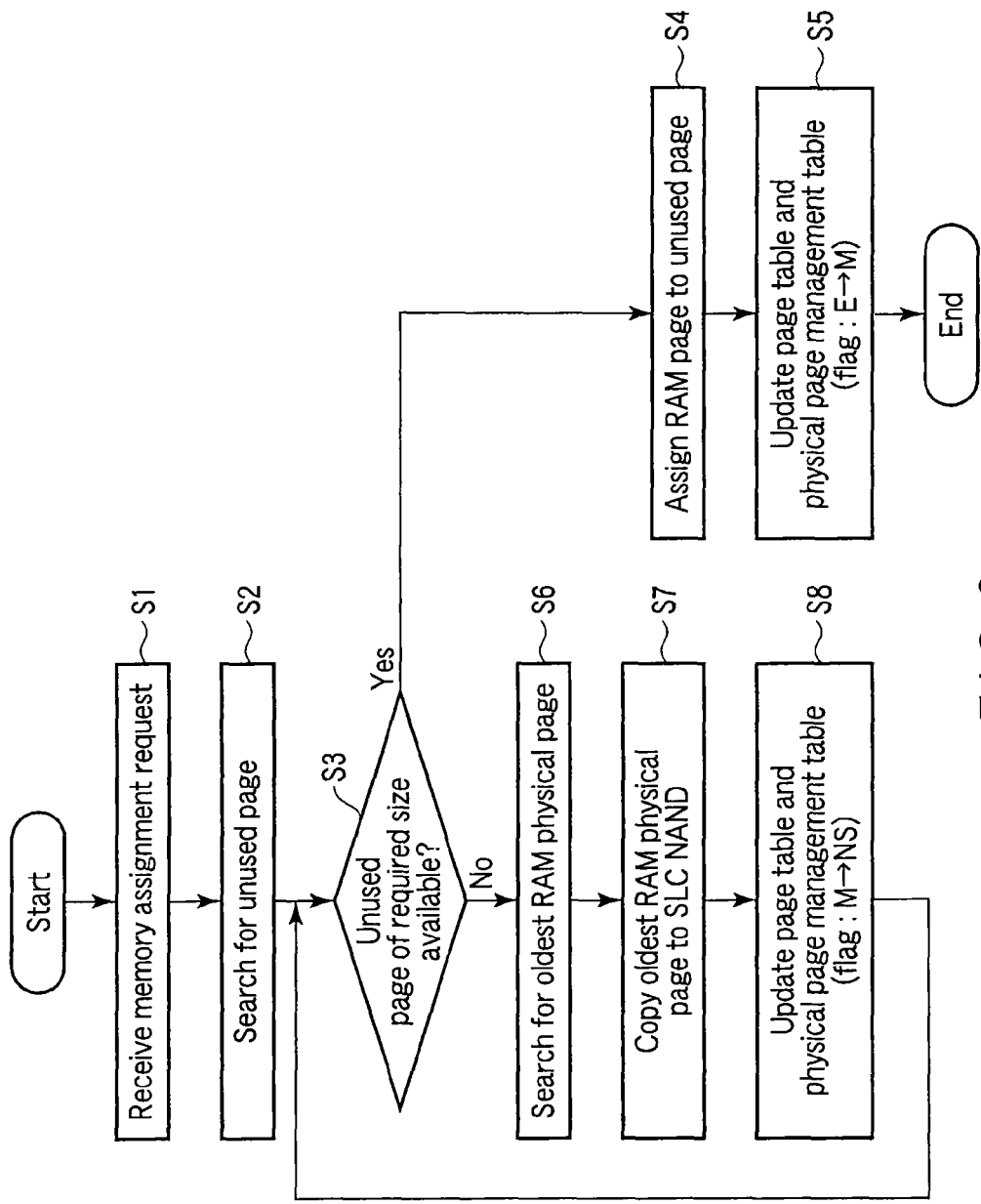
FIG. 6 is a flowchart of assignment of memory regions by the memory controller according to the embodiment.

In general, according to one embodiment, a storage device management device is disclosed. The management device is connected to a random access memory, a first storage device having a lower rewrite count upper-limit than the random access memory, and a processor. When the random access memory includes a free region sufficient to store write data which is a target of a write request from the processor, the write data is stored onto the random access memory. Data on the random access memory selected in the descending order of elapsed time from the last access is sequentially copied onto the first storage device, and a region in the random access memory which has previously stored the copied data is released. When read data which is a target of a read request from the processor is stored on the random access memory, the read data is read from the random access memory to the processor. When the read data is stored on the first storage device, the read data is copied onto the random access memory and read from the random access memory to the processor.

An embodiment will be described below with reference to the drawings. In the description below, components with substantially the same functions and configurations are denoted by the same reference numerals. Duplicate descriptions are given only when required.

Each functional block can be implemented as hardware, software, or a combination of hardware and software. Thus, in general, each block will be described in terms of its functions so as to clearly indicate which of the above-described configurations the functional block has. Whether such functions are carried out by hardware or software depends on design restrictions imposed on a specific embodiment or the whole system. Those skilled in the art can implement the functions by any of various methods for each specific embodiment. However, all the implementation techniques are included in the scope of the embodiment. Furthermore, it is not essential that the functional blocks are distinguished from one another as described below in specific examples. For example, some of the functions may be carried out by functional blocks different from those illustrated below. Moreover, the illustrated functional block may be divided into functional sub-blocks. The embodiment is not limited by the specification of the particular functional blocks.

FIG. 1 is a block diagram showing a memory system and a processor according to an embodiment. As shown in FIG. 1, a memory system 2 is connected to a processor 1 (information processing device) 1. The memory system 2 includes a memory controller 3 and a plurality of storage devices 4a to 4c.

The processor 1 is connected to a memory controller (memory management device) 3 via a bus. The memory controller 3 is connected to the plurality of memories. In FIG. 1, the three storage devices 4a to 4c are illustrated. The memory controller 3 and the storage devices 4a to 4c form the memory system 2. The storage devices 4a to 4c form a main memory for the memory system 2.

Now, the configuration and operation of each component will be described in further detail. The processor 1 includes a cache memory 11. The cache memory 11 functions as a normal data cache or an instruction cache. The processor 1 reads data (including programs and commands) stored on the storage devices 4a to 4c or a secondary storage device (not shown in the drawings) to execute a process requested by a user via an application (including an operation system) in accordance with the data or using the data.

The memory controller 3 reads data (including programs and commands) stored on the storage devices 4a to 4c or the secondary storage device (not shown in the drawings) to manage how to store data on the storage devices 4a to 4c in accordance with the data or using the data (to be discussed later). The memory controller 3 executes data read and data write requested by the processor 1. The memory controller 3 includes several functional blocks (sub-units). The functional blocks actually execute one or more of various operations performed by the memory controller 3. Specifically, the functional blocks include an unused page preparation section 31, a memory operation control section 32, a table reference section 33, a table management (update) section 34, and a flag inspection section 35. The operation of the memory controller 3, including the operations of the functional blocks, will be described below in detail.

The storage devices 4a to 4c comprise memories of different types and characteristics. In order of the storage devices 4a, 4b, and 4c, the speed at which the storage device can read and write data decreases, the capacity of the storage device increases, and the rewrite count upper-limit increases. That is, the storage device 4a can write and read data faster than and has a smaller capacity and a higher rewrite count upper-limit than the storage device 4b. Similarly, the storage device 4b can write and read data faster and has a smaller capacity and a higher rewrite count upper-limit than the storage device 4c.

A specific example of the storage device 4a is any RAM and is typically a memory that meets specifications required for the use in a general computer as a main memory. More specific examples of the storage device 4a include magnetoresistive random access memory (MRAM), dynamic random access memory (DRAM), ferroelectric random access memory (FeRAM), phase change random access memory (PCRAM), and resistive random access memory (ReRAM). Other examples are FPM-DRAM, EDO-DRAM, and SDRAM, each utilized as a main memory in a general computer. However, since these memories other than DRAM are nonvolatile and whereas MRAM and FeRAM can write and read data at a high speed similarly to DRAM, MRAM and FeRAM are preferable. For example, using a nonvolatile memory reduces data required to be loaded from the secondary storage device to the main memory upon power restoration, and therefore reduces time required before the main memory is ready.

A specific example of the storage device 4b is a nonvolatile semiconductor memory. A more specific example of the storage device 4b includes a single level cell (SLC) type NAND flash memory. The NAND flash memory reads or writes data in units of pages and erases data in units of blocks. The page includes serially-connected memory cells. The block includes consecutive pages. A cell of the SLC NAND flash memory stores data of 1 bit. In general, the SLC NAND flash memory can read and write data faster and has a higher rewrite count upper-limit than a multi level cell (MLC) type NAND flash memory (to be described below). However, the SLC NAND flash memory has a lower bit density than the MLC NAND flash memory and is less favorable for increased capacity.

A specific example of the storage device 4c is a nonvolatile semiconductor memory. A more specific example of the storage device 4b includes the MLC NAND flash memory. A cell of the MLC NAND flash memory stores data of at least 2 bits. In general, the MLC NAND flash memory reads and writes data slower and has a lower rewrite count upper-limit than the SLC NAND flash memory. However, the MLC NAND flash memory has a higher bit density than the SLC NAND flash memory and is thus suitable for an increase in capacity. By way of example, the storage device 4c uses one cell to store 2-bit data.

The storage devices 4a to 4c are not limited to the described example. The number of memories is also not limited to the described example. For example, a storage device 4d (not shown in the drawings) may be provided. The storage device 4c can write and read data faster and has a smaller capacity and a higher rewrite count upper-limit than the storage device 4d. Additional memory with a similar relationship may be provided. According to the above-described example, an example of the storage device 4d is an MLC NAND flash memory configured to use one cell to store 3-bit data. Alternatively, the storage device 4d may be a hard disk drive.

Now, the operation of the memory system according to the present embodiment will be described. In the description below, the storage devices 4a to 4c are a RAM, an SLC NAND flash memory, and an MLC NAND flash memory, respectively by way of example, and therefore they may be referred to as the RAM, the SLC NAND flash memory, and the MLC NAND flash memory, respectively.

The memory controller 3 uses tables shown in FIG. 2 to FIG. 5 to manage the storage of data in the RAM 4a, the SLC NAND flash memory 4b, and the MLC NAND flash memory 4c. For example, after the memory system 2 is powered on, the memory controller 3 (table management section 34) reads a control program for the memory controller 3 from, for example, the secondary storage device onto the RAM 4a. The memory controller 3 operates in accordance with the control program. The control program may be read onto the RAM 36 dedicated to the memory controller 3.

After power-on, the memory controller 3 (table management section 34) creates tables configured as shown in FIG. 2 to FIG. 5, in the RAM 4a in accordance with the control program. The tables may be created on the RAM 36 dedicated to the memory controller 3.

FIG. 2 shows a page table (logical page address to physical page address conversion table). FIG. 3 shows a physical page management table for the storage device 4a (RAM). FIG. 4 shows a physical page management table for the storage device 4b (SLC NAND flash memory). FIG. 5 shows a physical page management table for the storage device 4c (MLC NAND flash memory).

As shown in FIG. 2, the page table includes entries for respective logical page addresses. The page table shows the status of data in each logical page. The entries are independent of one another in association with the respective pages in the SLC NAND flash memory 4b or the MLC NAND flash memory 4c. Typically, both the SLC NAND flash memory 4b and the MLC NAND flash memory 4c include pages each of the same size, for example, 4 kB. Therefore, a logical page address is assigned to each physical page size (in the above-described example, 4 kB). Correspondingly, the status of the storage device 4a (RAM) is also managed in units of the size equivalent to a physical page in the NAND flash 4b or 4c.

Each entry includes a flag field, a RAM address field, and a NAND address field. The flag field indicates rough position of data of the corresponding logical page address. Flags include E, M, NS, NM, MS, and MM, and one of these flags is entered into the flag field. E indicates that the data of the corresponding logical page address is not stored on any of the RAM 4a, the SLC NAND flash memory 4b, and the MLC NAND flash memory 4c. M indicates that the data of the corresponding logical page address is stored on the RAM 4a. NS indicates that the data of the corresponding logical page address is stored on the SLC NAND flash memory 4b. NM indicates that the data of the corresponding logical page address is stored on the MLC NAND flash memory 4c. MS indicates that the data of the corresponding logical page address is stored on both the RAM 4a and the SLC NAND flash memory 4b. MM indicates that the data of the corresponding logical page address is stored on both the RAM 4a and the MLC NAND flash memory 4c.

The RAM address field shows the physical page in the RAM 4a which stores the data of the corresponding logical page address when the corresponding flag is M or MS or MM. The NAND address field indicates the physical page in the SLC or MLC NAND flash memory 4b or 4c which stores the data of the corresponding logical page address when the corresponding flag is NS or NM or MS or MM.

As shown in FIG. 3, the RAM (storage device 4a) physical page management table includes entries for the respective physical pages in the RAM 4a. Each entry includes a valid/invalid indication field and a last access time field. The valid/invalid indication field indicates whether the corresponding physical page in the RAM 4a stores valid data. For example, "1" indicates that the corresponding physical page stores valid data. "0" indicates that the corresponding physical page stores no valid data.

The last access time field indicates the last time at which the corresponding physical page is accessed. The time is described using the elapsed time from a predetermined time point after the power-on of the memory system 2. Alternatively, the time may be an approximate value with any appropriate unit instead of an exact value.

As shown in FIG. 4, the SLC NAND flash (storage device 4b) physical page management table includes entries for the respective blocks in the SLC NAND flash memory 4b. Each entry includes a read count field, a write count field, a last access time field, and a valid/invalid field for each page. The read count field indicates the number of times that any of the physical pages in the corresponding block has been read since the erasure of the block. The write count field indicates the number of times that the corresponding block has been erased and rewritten with new data. The valid/invalid indication field for each page includes indication fields for the respective pages in the corresponding block. Each of the indication fields indicates whether the corresponding page stores valid data. For example, "1" indicates that the corresponding physical page stores valid date. "0" indicates that the corresponding physical page stores no valid date. The last access time field indicates the time at which new data is written in the corresponding block after the erasure of the block. The time is, for example, the elapsed time from a predetermined time point after the erasure of the corresponding block or the power-on of the memory system 2. Alternatively, the time may be an approximate value with any appropriate unit instead of an exact value.

In the illustrated embodiment, the last access time field is used as information for finding a block which has experienced erasure and writing earliest. Alternatively, this field is not used and the rule may be used that requires the block erasure and page write must follow the addresses of the physical pages. This method secures that the blocks are sequentially arranged with the lowermost address block having experienced data erasure and writing earliest and the uppermost address block having experienced data erasure and writing most lately. Thus, the block subjected to data erasure and write earliest can be easily found if an identification of such a block is stored.

As shown in FIG. 5, the MLC NAND flash (storage device 4c) physical page management table includes entries for the respective blocks in the MLC NAND flash memory 4c. Each entry includes a read count field, a write count field, a last access time field, and a valid/invalid field for each page. The features of data in these fields are the same as those in the SLC NAND flash physical page management table (FIG. 4).

Now, the operation of the memory system 2 (memory controller 3) will be described in detail. First, with reference to FIG. 6, assignment of a new memory region by the memory controller 3 will be described. FIG. 6 is a flowchart showing the assignment of a new memory region by the memory controller 3. As shown in FIG. 6, for example, a user issues a request to the memory system 2 via the processor 1 for securing a memory region which will store new data. Upon receiving the memory assignment request from the processor 1, the memory controller 3 executes the following steps.

For the purpose of simplification, the following description assumes that the processor 1 performs as an autonomous entity an operation performed by the processor 1 to fulfill a request made to the processor 1 by the user via an application or an operating system in accordance with a program for simplification. Similarly, it assumes that the memory controller 3 performs as an autonomous entity an operation performed by the memory controller 3 to fulfill a request from the processor 1 in accordance with a program for controlling the memory controller 3.

Upon receiving a memory assignment request (step S1), the memory controller 3 attempts to assign the assignment request region to the uppermost memory, i.e., the memory (RAM) 4a, which has the highest rewrite count upper-limit. To this end, the memory controller 3 (unused page preparation section 31) first refers to the flags in the page table. The memory controller 3 (unused page preparation section 31), based on the flags, searches for unused pages (logical pages to which no valid data is assigned) that are consecutive many enough to satisfy the assignment request (step S2).

The memory controller 3 (unused page preparation section 31) refers to the valid/invalid indication field in the RAM physical page management table to determine whether it is possible reserve a sufficient number of unused RAM physical pages to store assignment target data (step S3).

If the required RAM physical pages can be reserved, the process shifts to step S4. In step S4, the memory controller 3 (unused page preparation section 31) determines to assign the RAM physical pages reserved in step S3 to the unused logical pages found in step S2.

The memory controller 3 (table management section 34) updates the tables to reflect a state resulting from the assignment in step S4 (step S5). That is, firstly, in entries in the page table corresponding to the assigned data, the memory controller 3 writes M in the flag fields and writes the assigned RAM physical page addresses in the RAM address fields. Secondly, the memory controller 3 writes "1" in the valid/invalid indication fields in entries in the RAM physical page management table which stores the assigned data, and writes the time in the last access time fields.

If the determination in step S3 is false, the process shifts to step S6. Through a series of steps starting at step S6, the memory controller 3 reserves a region in the RAM 4a. First, in step S6, the memory controller 3 (table reference section 33) refers to the last access time field in the RAM physical page management table to find the entry (i.e., RAM physical page) with the earliest last access time.

The memory controller 3 (memory operation control section 32) controls the RAM 4a and the lower memory (SLC NAND flash memory) 4b to copy the data in the oldest RAM physical page to an erased page in the SLC NAND flash memory 4b (step S7). Thus the memory operation control section 32 controls data read, data write, data erase, and the like in the memories 4a to 4c.

The memory controller 3 (table management section 34) updates the tables to reflect a state resulting from the copy in step S7 (step S8). That is, firstly, in entries in the page table which correspond to the copy target data, the memory controller 3 writes NS in the flag fields and writes the SLC-NAND-flash physical pages which now store the copied data in the NAND address fields. Secondly, the memory controller 3 writes "0" in the valid/invalid indication fields in entries in the RAM physical page management table which correspond to the physical pages which have previously stored the copy target data. Thirdly, the memory controller 3 writes "1" in the valid/invalid indication fields in the SLC NAND flash physical page management table for pages which now store copied data, and writes the time in the last access time fields in entries corresponding to the blocks which include the pages which newly store the copied data. Thus, the memory controller 3 reserves a region in the RAM 4a which is sufficient to store the assignment target data.

The process returns to step S3, where the memory controller 3 (unused page preparation section 31) determines whether required RAM physical pages can be reserved. If the required RAM physical pages can be reserved, the process proceeds to step S4. Otherwise, steps S6 to S8 are repeated until the required RAM physical pages are reserved.

Steps S6 to S8 may be performed not only when the physical pages required to store the write target data cannot be reserved, but when the unused page preparation section 31 determines that a specific condition has been met. Such moving of data in the RAM 4a into the SLC NAND flash memory 4b may occur, for example, when a predetermined capacity (for example, 80% of the total capacity) of the RAM 4a is filled.

In the illustrated embodiment, upon receiving a memory assignment request from the processor 1, the memory controller 3 carries out memory assignment. In another embodiment, the memory controller 3 may refer to the page table (logical-physical conversion table) in FIG. 2 upon receiving a memory write request from the processor 1, and if the flag for the write target logical page is "E", which indicates that the page is unassigned, then memory region is assigned to the target page in accordance with procedure in FIG. 6, followed by a write process (to be described below) on the page in accordance with the memory controller (memory operation control section 32).

Figure 7:
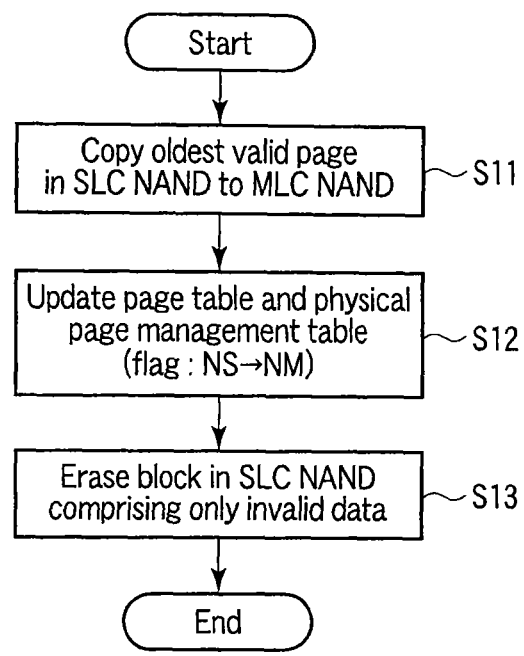
FIG. 7 is a flowchart of garbage collection in the SLC type NAND flash carried out by the memory controller according to the embodiment.

The memory controller 3 performs garbage collection of the data in the SLC NAND flash 4b when a specific condition is met. The memory controller 3 moves collected data to the lower memory (MLC NAND flash) 4c, which is now described with reference to FIG. 7. FIG. 7 is a flowchart showing the garbage collection performed on the SLC NAND flash 4b by the memory controller 3. Such moving of data in the SLC NAND flash 4b into the MLC NAND flash memory 4a may occur, for example, when a specific capacity (for example, 80% of the total capacity) of SLC NAND flash 4b is filled. Alternatively, the steps in FIG. 7 take place when the SLC-NAND-flash erased pages which will store data copied from the RAM 4a are insufficient in step S7 in FIG. 6. The unused page preparation section 31 determines whether to perform the garbage collection.

As shown in FIG. 7, the memory controller 3 (unused page preparation section 31) refers to the last access time fields in the SLC NAND flash physical page management table. Then, the memory controller 3 sequentially refers to the valid/invalid indication fields in one or more blocks in chronological order from the oldest entry (the block in the SLC NAND flash 4b) to find pages which stores valid data. Then, the memory controller 3 (memory operation control section 32) controls the SLC and MLC NAND flashes 4b and 4c to copy the data in the found valid pages into erased pages in the MLC NAND flash 4c (step S11). For example, the copied data is sequentially written in the MLC-NAND-flash erased blocks from the page with the lowermost physical address in ascending order of address without skipping a page.

The memory controller 3 (table management section 34) updates the tables to reflect a state resulting from the copy in step S11 (step S12). That is, firstly, in entries in the page table which correspond to the copy target data, the memory controller 3 writes NM in the flag field and writes the MLC-NAND-flash physical pages which now store the copied data in the NAND address fields. Secondly, the memory controller 3 writes "0" in the valid/invalid indication fields in entries in the SLC NAND flash physical page management table which correspond to physical pages which have previously stored the copy target data. Thirdly, the memory controller 3 writes "1" in the valid/invalid indication fields in the MLC NAND flash physical page management table for pages which now store copied data, and writes the time in the last access time fields in entries corresponding to the blocks which include the pages which newly store the copied data.

The memory controller 3 (memory operation control section 32) erases the data in the SLC-NAND-flash blocks which contain only invalid data resulting from the copy into the MLC NAND flash 4c (step S13). Thus, new erased blocks are created.

Figure 8:
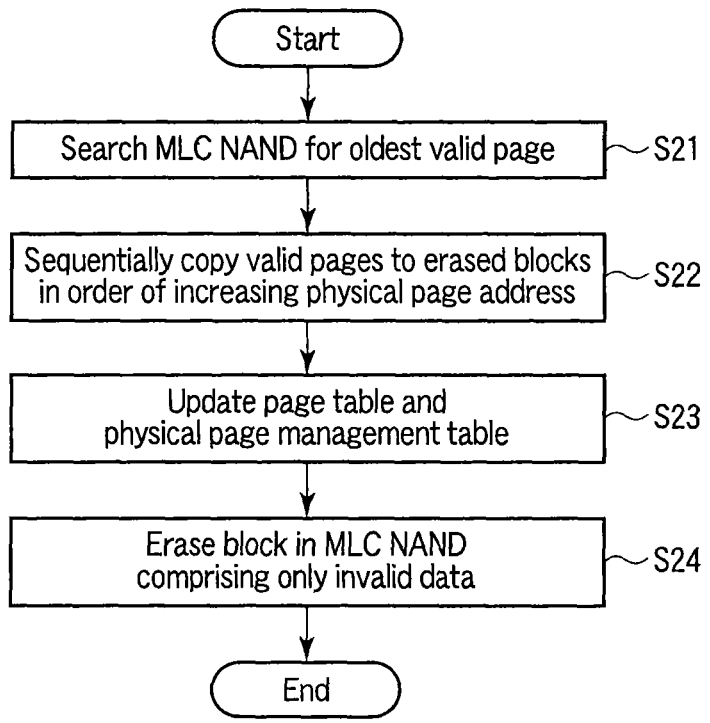
FIG. 8 is a flowchart of garbage collection in the MLC type NAND flash carried out by the memory controller according to the embodiment.

The memory controller 3 performs garbage collection of the data in the MLC NAND flash 4c when a specific condition is met, which is now described with reference to FIG. 8. FIG. 8 is a flowchart showing the garbage collection performed on the MLC NAND flash 4c by the memory controller 3. Such a garbage collection on the MLC NAND flash 4c may occur, for example, when a specific capacity (for example, 80% of the total capacity) of MLC NAND flash 4c is filled. The unused page preparation section 31 determines whether to perform the garbage collection.

As shown in FIG. 8, the memory controller 3 (unused page preparation section 31) refers to the last access time fields in the MLC NAND flash physical page management table. Then, the memory controller 3 refers to the valid/invalid indication field in the oldest entry (MLC NAND flash physical block) to find pages which store valid data (step S21). Then, the memory controller 3 (memory operation control section 32) controls the MLC NAND flash 4c to sequentially write the data in the found valid pages into MLC-NANDflash erased blocks from the page with the lowermost physical address in ascending order of address without skipping a page (step S22).

The memory controller 3 (table management section 34) updates the tables to reflect a state resulting from the copy in step S22 (step S23). That is, firstly, in entries in the page table which corresponds to the copy target data, the memory controller 3 writes the MLC-NAND-flash physical pages which now store copied data in the NAND address fields. Secondly, the memory controller 3 writes "0" in the valid/invalid indication fields in entries in the MLC NAND flash physical page management table which correspond to physical pages which have previously stored the copy target data. Thirdly, the memory controller 3 writes "1" in the valid/invalid indication fields in the MLC NAND flash physical page management table for pages which now store the copied data, and writes the time in the last access time fields in entries corresponding to the blocks which include the pages which newly store the copied data.

The memory controller 3 (memory operation control section 32) erases the data in the MLC-NAND-flash blocks which contain only invalid data resulting from the copy (step S24). Thus, new erased blocks are created.

If additional memory is provided under the memory 4c, valid pages collected from the MLC NAND flash 4c are copied to this lower memory. This process is analogically the same as that of copying data collected from the SLC NAND flash 4b to the MLC NAND flash 4c (FIG. 7). Then, in analogically the same manner, data in a certain memory is copied to the lower memory by garbage collection, followed by tables update.

Figure 9:
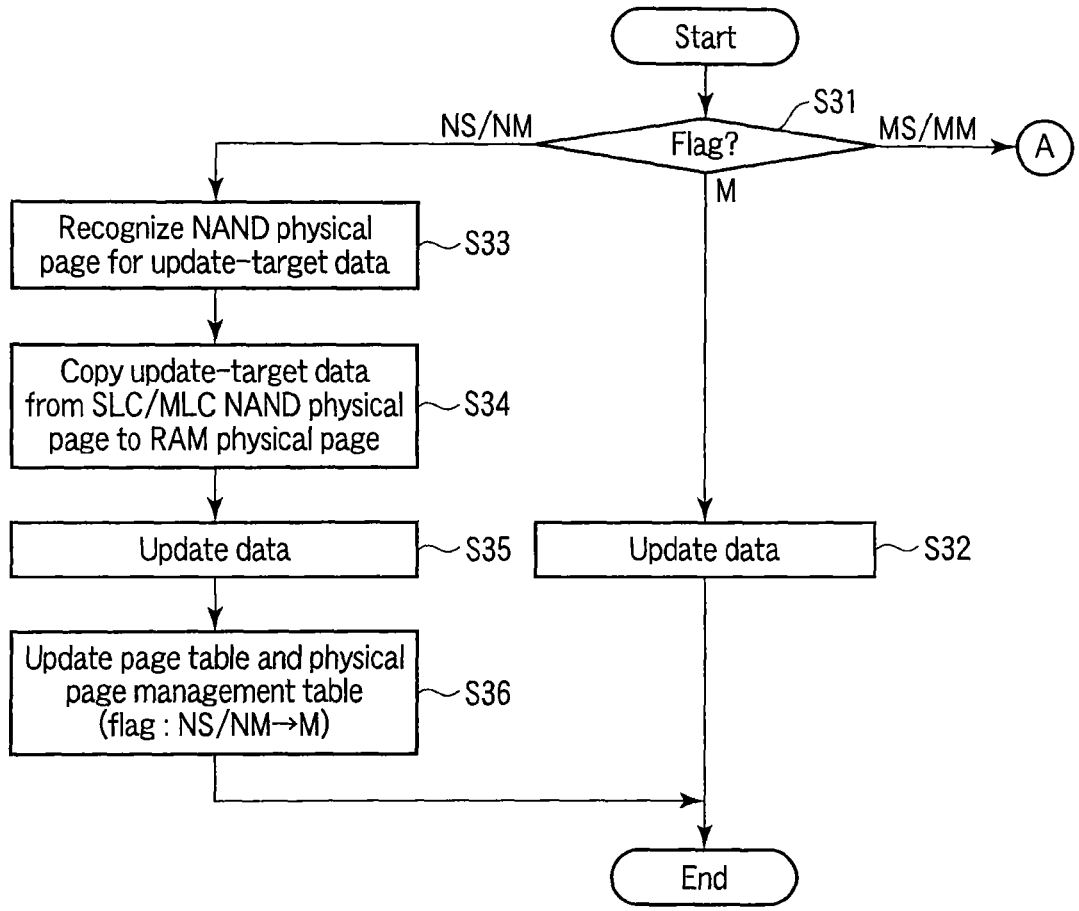
FIG. 9 is a flowchart of a process carried out by the memory controller according to the embodiment in response to an update request for data in a memory system.

Steps carried out in response to an update request (write request) for the data in the memory system 2 from the processor 1 will now be described with reference to FIG. 9. FIG. 9 is a flowchart of a process carried out by the memory controller 3 in response to an update request for the data in the memory system 2. As shown in FIG. 9, upon receiving a data update request from the processor 1, the memory controller 3 checks whether the update target data is stored in the RAM 4a. Specifically, the memory controller 3 (flag inspection section 35) checks the flags in entries in the page table which correspond to the update target data (step S31).

If the determination in step S31 indicates that the flags are M, the process shifts to step S32. In step S32, the memory controller 3 (memory operation control section 32) controls the RAM 4a to update the data in accordance with the update request. The memory controller 3 also updates the time in the last access time fields in entries in the RAM physical page management table which correspond to the update target data.

Figure 11:
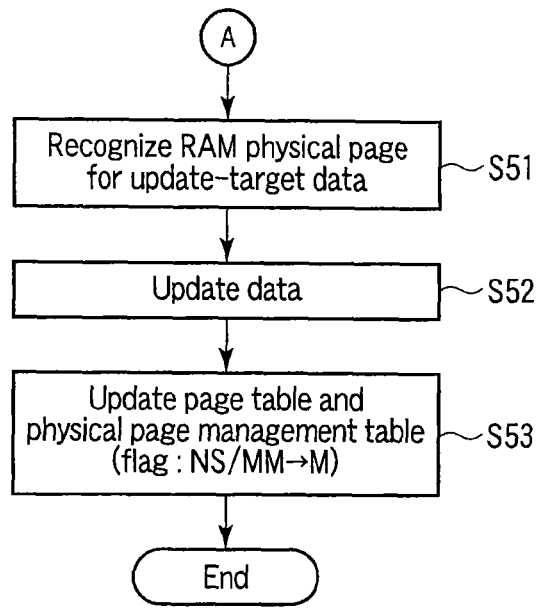
FIG. 11 is a flowchart of a part of a process carried out by the memory controller according to the embodiment on the update request for the data in the memory system.

Steps for the determination in step S31 indicative of the flags are MS or MN will be described below with reference to FIG. 11.

When the determination in step S31 indicates that the flags are NS or NM, the process shifts to step S33. The memory controller 3 carries out a series of steps starting at step S33 to copy the data in the NAND flash 4b or 4c onto the RAM 4a. Specifically, the memory controller 3 (table reference section 33) refers to the NAND address fields in entries in the page table which correspond to the update target data to recognize the SLC or MLC NAND flash physical pages which store the update target data (step S33).

The memory controller 3 (memory operation control section 32) controls the RAM 4a and the NAND flash 4b or 4c to copy the update target data to unused pages in the RAM 4a (step S34). Then, the memory controller 3 (memory operation control section 32) controls the RAM 4a to update the copied data in accordance with the update request (step S35).

The memory controller 3 (table management section 34) updates the tables to reflect a state resulting from the copy in step S34 (step S36). That is, firstly, in entries in the page table which correspond to the update target data, the memory controller 3 updates the flag fields from NS or NM to M and writes in the RAM address fields RAM physical pages which now store the updated data. Secondly, the memory controller 3 writes "1" in the valid/invalid indication fields in entries in the RAM physical page management table which correspond to physical pages which now store the updated data, and writes the time to the last access time fields. Thirdly, the memory controller 3 writes "0" in the valid/invalid indication fields for pages in the SLC or MLC NAND flash physical page management table which have previously stored the update target data. Invalid data in the NAND flash 4b or 4c is erased by garbage collection that involves erasing of blocks containing no valid data.

Steps carried out in response to a read request for the data in the memory system 2 from the processor 1 will now be described with reference to FIG. 10. FIG. 10 is a flowchart of a process carried out by the memory controller 3 in response to a read request for the data in the memory system 2. As shown in FIG. 10, upon receiving a data read request from the processor 1, the memory controller 3 checks whether read target data is stored in the RAM 4a. Specifically, the memory controller 3 (flag inspection section 35) checks whether the flags in entries in the page table which correspond to the read target data are one of M, MS, and MN or not (step S41).

If the determination in step S41 is true, the process shifts to step S42. In step S42, the memory controller 3 (memory operation control section 32) controls the RAM 4a to read the read target data into the processor 1, and updates the time in the last access time fields in entries in the RAM physical page management table which correspond to the read target data.

If the determination in step S41 is false, the process shifts to step S43. The memory controller 3 carries out step 43 and subsequent steps similar to the corresponding steps for the update request (FIG. 9) to copy the data in the NAND flash 4b or 4c onto the RAM 4a. Specifically, the memory controller 3 (table reference section 33) refers to the NAND address fields in entries in the page table which correspond to the read target data to recognize the SLC or MLC NAND flash physical pages which store the read target data (step S43).

The memory controller 3 (memory operation control section 32) controls the RAM 4a and the NAND flash 4b or 4c to copy the read target to unused pages in the RAM 4a (step S44). Then, the memory controller 3 (memory operation control section 32) controls the RAM 4a to read the read target data to the processor 1 (step S45).

The memory controller 3 (table management section 34) updates the tables to reflect a state resulting from the copy in step S44 (step S46). That is, firstly, in entries in the page table which correspond to the read target data, the memory controller 3 updates the flag fields from NS to MS or from NM to MM and writes in the RAM address fields RAM physical pages which now store the read target data. Secondly, the memory controller 3 writes "1" in the valid/invalid indication fields in entries in the RAM physical page management table which correspond to physical pages which now store read target data, and writes the time in the last access time fields.

An update request for data effectively present both on the RAM 4a and on the NAND flash 4b or 4c after step S46 corresponds to the case where the flags are determined to be MS or MM in step S31 in FIG. 9. Steps carried out in response to such an update request will be described with reference to FIG. 11. FIG. 11 is a flowchart of a part of a process carried out by the memory controller 3 in response to an update request for the data in the memory system 2. As shown in FIG. 11, if the flags in entries in the page table which correspond to the update target data are MS or MM, the process shifts to step S51.

The memory controller 3 (table reference section 33) refers to the RAM address fields in the entries in the page table which correspond to the update target data to recognize RAM physical pages which store the update target data (step S51).

The memory controller 3 (memory operation control section 32) controls the RAM 4a to update the data in accordance with the update request (step S52). The memory controller 3 (table management section 34) then updates the tables to reflect a state resulting from the update in step S52 (step S53). That is, firstly, in entries in the page table which correspond to the update target data, the memory controller 3 updates the flag fields from MS or MM to M because the update target data stored in the NAND flash 4b or 4c is no longer valid. Secondly, the memory controller 3 writes "0" in the valid/invalid indication fields for pages in the SLC or MLC NAND flash physical page management table which have previously stored the update target data. Thirdly, the memory controller 3 writes the time in the last access time fields in entries in the RAM physical page management table which correspond to the updated data.

Figure 12:
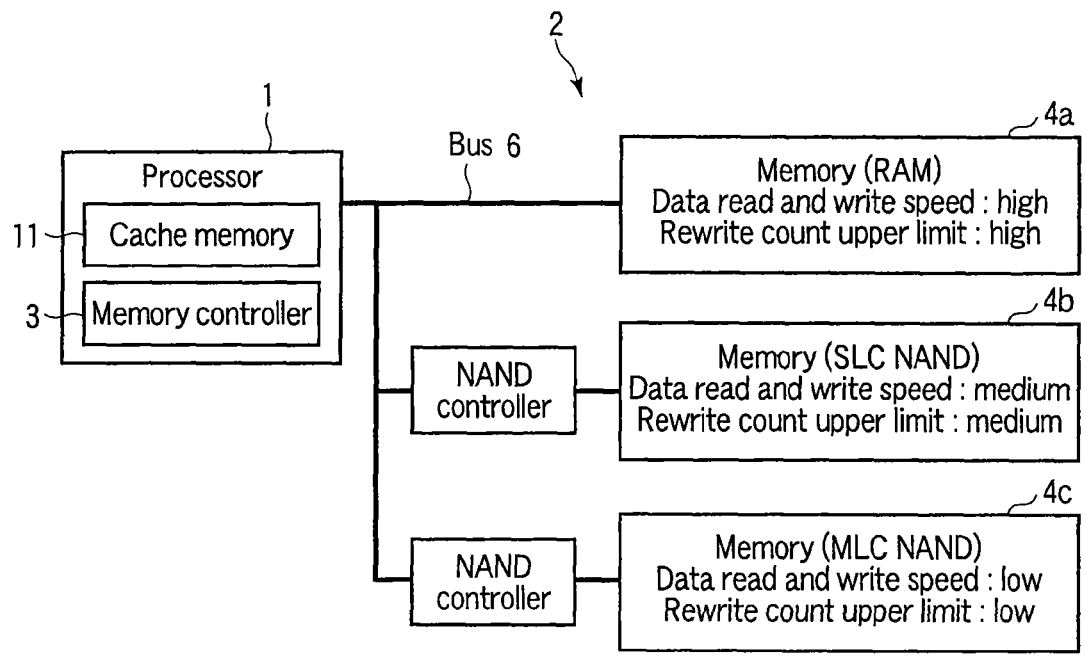
FIG. 12 is a block diagram of a memory system according to another embodiment of the present invention.

In the configuration in FIG. 1, the memory controller 3 is provided independently of the processor 1. However, the present embodiment is not limited to this configuration. For example as shown in FIG. 12, the processor 1 may fulfill the functions of the memory controller 3 in accordance with a control program for implementing the functions of the memory controller 3. In this example, the RAM 4a is connected directly to the processor 1 by the bus 6. The NAND flash 4b is connected to the processor 1 via a NAND controller configured to control the NAND flash 4b. The NAND flash 4c is connected to the processor 1 via a NAND controller configured to control the NAND flash 4c.

As described above, the memory controller according to the present embodiment manages the memories in an integrated fashion using hierarchies. In response to a write request, the memory controller first attempts to store write target data in the uppermost memory, which has highest rewrite count upper-limit. The memory controller appropriately moves the data in a memory to the lower memory sequentially in descending order of non-accessed duration. In response to a read request or an update request for the data in the memories other than the uppermost one, the memory controller copies the read or update target data to the uppermost memory. Such management of the storage position allows data with a short non-accessed duration to remain in a memory with a high rewrite count upper-limit, while allowing data with a long non-accessed duration to be moved to a memory with a lower rewrite count upper-limit. This avoids degradation of specific one or more of memories managed by the memory controller according to the present embodiment.

Note that the storage device may be selected to store data in accordance with the properties of data; however many processes are required to accurately determine the properties of the data, and the properties are not always accurately determined. Furthermore, the file name extensions (e.g., .doc, .txt, .jpg) of data files may be used; however data files with a certain file name extension may be used in another manner, and some data files even have no file name extension. In contrast, according to the present embodiment, the data is moved in accordance with the non-accessed duration, allowing such a problem to be eliminated.

Furthermore, the data movement is automatically determined based on the data non-access duration, which is an easily managed criterion. Thus, users of the memory system comprising the memory controller according to the memory controller are not prompted to input information for determining the data movement, and the malfunction of the determination for the data movement does not occur which would arise in the case of the use of data properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device management device connected to a random access memory, a first storage device having a lower rewrite count upper-limit than the random access memory, and a processor, comprising:

the first storage device is a NAND flash memory in data is erased in units of blocks each of which includes pages, when the random access memory includes a free region sufficient to store write data which is a target of a write request from the processor, the write data is stored onto random access memory, and a first table which indicates which one, or both, of the random access memory and the first storage device and which region of the one, or both, of the random access memory and the first storage device stores data assigned with a logical address and a second table which indicates whether a region in the random access memory stores valid data and a time of the last access to the region are updated;

data on the random access memory selected in the descending order of elapsed time from the last access is sequentially copied onto the first storage device, and a region in the random access memory which has previously stored the copied data is released, and the first table and a third table which indicates whether a region in the first storage device stores valid data and a time of the last access to the region are updated;

when read data which is a target of a read request from the processor is stored on the random access memory, the read data is read from the random access memory to the processor;

when the read data is stored on the first storage device, the read data is copied onto the random access memory and read from the random access memory to the processor;

the management device receives a data update request;

when update data which is an update request target is stored on the random access memory, the management device updates the update data on the random access memory; and when the update data is stored on the first storage device, the management device copies the update data onto the random access memory and updates the update data on the random access memory.

2. The storage device management device according to claim 1, wherein when the random access memory fails to include a free region sufficient to store the write data, the management device sequentially copies the data on the random access memory selected in the descending order of elapsed time from the last access onto the first storage device, and releases the region in the random access memory which has previously stored the copied data.

3. The storage device management device according to claim 2, wherein
the first storage device includes storage regions in which overwriting of data is impracticable,
the storage regions have the same size,
the management device manages status of the random access memory in units of storage areas having the same size as the size of the storage regions, and
the management device searches for consecutive free ones of the storage areas sufficient to store the write data when the management device receives request to write the write data.

4. The storage device management device according to claim 1, wherein:
the first storage device includes storage regions in which overwriting of data is impracticable, and erases data in units of an erase region which includes consecutive storage regions; and
the random access memory or another memory holds:
the first table indicating, for each of logical addresses, a state flag indicating a state of data assigned with the corresponding logical address, an address of a region in the random access memory which stores the data assigned with the corresponding logical address, and an address of a region in the first storage device which stores the data assigned with the corresponding logical address;
the second table indicating, for each of the storage regions in the random access memory, a valid flag indicating whether the corresponding storage region stores valid data, and the time of the last access to the corresponding storage region; and
the third table indicating, for each of addresses of the erase regions in the first storage device, the time of the last access to a storage region in the corresponding erase region.

5. The storage device management device according to claim 1, wherein:
the management device is connected to a second storage device having a lower rewrite count upper-limit than the first storage device;
the management device sequentially copies valid data on the first storage device selected in the descending order of elapsed time from the last access onto the second storage device; and
when the read data is stored on the second storage device, the management device copies the read data onto the random access memory and reads the read data from the random access memory to the processor.

6. The storage device management device according to claim 5, wherein when the random access memory fails to include a free region sufficient to store the write data, the management device sequentially copies the data on the random access memory selected in the descending order of elapsed time from the last access onto the first storage device, and releases the region in the random access memory which has previously stored the copied data.

7. The storage device management device according to claim 5, wherein:
the management device receives a data update request;
when update data which is an update request target is stored on the random access memory, the management device updates the update data on the random access memory; and
when the update data is stored on the first or second storage device, the management device copies the update data onto the random access memory and updates the update data on the random access memory.

8. The storage device management device according to claim 5, wherein:
the second storage device includes storage regions in which overwriting of data is impracticable, and erases data in units of an erase region which includes consecutive storage regions; and
the management device copies valid data on the second storage device selected in the descending order of elapsed time from the last access onto storage regions in an erased erase region in the second storage device selected in the ascending order of addresses of the storage regions, and releases the storage regions in the second storage device which have previously stored the copied data.

9. The storage device management device according to claim 5, wherein:
the first and second storage devices each includes storage regions in which overwriting of data is impracticable, and erases data in units of an erase region including consecutive storage regions, and
the random access memory or another memory holds:
the first table indicating, for each of logical addresses, a state flag indicating a state of data assigned with the corresponding logical address, an address of a region in the random access memory which stores the data assigned with the corresponding logical address, and an address of a region in the first or second storage device which stores the data assigned with the corresponding logical address;
the second table indicating, for each of the storage regions in the random access memory, a valid flag indicating whether the corresponding storage region stores valid data, and the time of the last access to the corresponding storage region;
the third table indicating, for each of addresses of the erase regions in the first storage device, the time of the last access to a storage region in the corresponding erase region; and
a fourth table indicating, for each of addresses of the erase regions in the second storage device, the time of the last access to a storage region in the corresponding erase region.

10. The storage device management device according to claim 5, wherein:
the first storage device is a NAND flash memory which uses one memory cell to store one bit; and
the second storage device is a NAND flash memory which uses one memory cell to store at least two bits.

11. The storage device management device according to claim 1, wherein
when a predetermined capacity of the random access memory is filled, the management device sequentially copies the data on the random access memory selected in the descending order of elapsed time from the last access onto the first storage device, and releases the region in the random access memory which has previously stored the copied data.

12. A managing method of a random access memory and a first storage device having a lower rewrite count upper-limit than the random access memory, the first storage device is a NAND flash memory in which data is erased in units of blocks each of which includes pages, the method comprising:
when the random access memory includes a free region sufficient to store write data which is a target of a write request from the processor, storing the write data onto the random access memory and updating a first table and a second table, the first table indicating which one or both, of the random access memory and the first storage device and which region of the one or both, of the random access memory and the first storage device stores data assigned with a logical address, the second table indicating whether a region in the random access memory stores valid data and a time of the last access to the region;

sequentially copying data on the random access memory selected in the descending order of elapsed time from the last access onto the first storage device, releasing a region in the random access memory which has previously stored the copied data, and updating the first table and a third table which indicates whether a region in the first storage device stores valid data and a time of the last access to the region;

when read data which is a target of a read request from the processor is stored on the random access memory, reading the read data from the random access memory to the processor;

when the read data is stored on the first storage device, copying the read data onto the random access memory and reading the read data from the random access memory to the processor;

receiving a data update request;

when update data which is an update request target is stored on the random access memory, updating the update data on the random access memory; and when the update data is stored on the first storage device, copying the update data onto the random access memory and updating the update data on the random access memory.

13. The method according to claim 12, further comprising, when the random access memory fails to include a free region sufficient to store the write data, sequentially copying the data on the random access memory selected in the descending order of elapsed time from the last access onto the first storage device; and releasing the region in the random access memory which has previously stored the copied data.

14. The method according to claim 13, wherein the first storage device includes storage regions in which overwriting of data is impracticable, the storage regions have the same size, the management device manages status of the random access memory in units of storage areas having the same size as the size of the storage regions, and the method further comprises searching for consecutive free ones of the storage areas sufficient to store the write data when the management device receives request to write the write data.

15. The method according to claim 12, wherein the first storage device includes storage regions in which overwriting of data is impracticable, and erases data in units of an erase region which includes consecutive storage regions, and the method further comprises:

creating the first table indicating, for each of logical addresses, a state flag indicating a state of data assigned with the corresponding logical address, an address of a region in the random access memory which stores the data assigned with the corresponding logical address, and an address of a region in the first storage device which stores the data assigned with the corresponding logical address;

creating the second table indicating, for each of the storage regions in the random access memory, a valid flag indicating whether the corresponding storage region stores valid data, and the time of the last access to the corresponding storage region; and creating the third table indicating, for each of addresses of the erase regions in the first storage device, the time of the last access to a storage region in the corresponding erase region.

16. The method according to claim 12, further comprising:

sequentially copying valid data on the first storage device selected in the descending order of elapsed time from the last access onto a second storage device, the second storage device having a lower rewrite count upper-limit than the first storage device; and when the read data is stored on the second storage device, copying the read data onto the random access memory and reading the read data from the random access memory to the processor.

17. The method according to claim 16, further comprising, when the random access memory fails to include a free region sufficient to store the write data, sequentially copying the data on the random access memory selected in the descending order of elapsed time from the last access onto the first storage device, and releasing the region in the random access memory which has previously stored the copied data.

18. The method according to claim 16, further comprising:

receiving a data update request;

when update data which is an update request target is stored on the random access memory, updating the update data on the random access memory; and when the update data is stored on the first or second storage device, copying the update data onto the random access memory and updating the update data on the random access memory.

19. The method according to claim 16, wherein the second storage device includes storage regions in which overwriting of data is impracticable, and erases data in units of an erase region which includes consecutive storage regions; and the method further comprises:

copying valid data on the second storage device selected in the descending order of elapsed time from the last access onto storage regions in an erased erase region in the second storage device selected in the ascending order of addresses of the storage regions, and releasing the storage regions in the second storage device which have previously stored the copied data.

20. The method according to claim 16, wherein the first and second storage devices each includes storage regions in which overwriting of data is impracticable, and erases data in units of an erase region which includes consecutive storage regions, and the method further comprises:

creating the first table indicating, for each of logical addresses, a state flag indicating a state of data assigned with the corresponding logical address, an address of a region in the random access memory which stores the data assigned with the corresponding logical address, and an address of a region in the first or second storage device which stores the data assigned with the corresponding logical address;

creating the second table indicating, for each of the storage regions in the random access memory, a valid flag indicating whether the corresponding storage region stores valid data, and the time of the last access to the corresponding storage region;

creating the third table indicating, for each of addresses of the erase regions in the first storage device, the time of the last access to a storage region in the corresponding erase region; and creating a fourth table indicating, for each of addresses of the erase regions in the second storage device, the time of the last access to a storage region in the corresponding erase region.

21. The method according to claim 16, wherein:

the first storage device is a NAND flash memory which uses one memory cell to store one bit; and the second storage device is a NAND flash memory which uses one memory cell to store at least two bits.

22. The method according to claim 12, further comprising:

when a predetermined capacity of the random access memory is filled, sequentially copying the data on the random access memory selected in the descending order of elapsed time from the last access onto the first storage device, and releasing the region in the random access memory which has previously stored the copied data.

* * * * *